(12) United States Patent
Matsumoto et al.

(10) Patent No.: US 8,064,162 B2
(45) Date of Patent: Nov. 22, 2011

(54) MAGNETIC HEAD AND DISK DRIVE PROVIDED WITH THE SAME

(75) Inventors: Takuya Matsumoto, Ome (JP); Tomoko Taguchi, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 24 days.

(21) Appl. No.: 12/759,607

(22) Filed: Apr. 13, 2010

(65) Prior Publication Data

US 2010/0315747 A1   Dec. 16, 2010

(30) Foreign Application Priority Data

Jun. 12, 2009   (JP) ................... 2009-141505

(51) Int. Cl.
*G11B 5/31* (2006.01)
(52) U.S. Cl. .................................. 360/125.02
(58) Field of Classification Search ............. 360/125.02
See application file for complete search history.

(56) References Cited

U.S. PATENT DOCUMENTS

| | | | | |
|---|---|---|---|---|
| 7,505,232 B2* | 3/2009 | Haginoya et al. | ............. | 360/319 |
| 7,562,436 B2* | 7/2009 | Jayasekara | ................. | 29/603.13 |
| 7,573,683 B1* | 8/2009 | Benakli et al. | ................ | 360/319 |
| 7,649,712 B2* | 1/2010 | Le et al. | ....................... | 360/125.3 |
| 7,869,165 B2* | 1/2011 | Miyauchi et al. | ............. | 360/319 |
| 7,872,835 B2* | 1/2011 | Guan | ............................ | 360/319 |
| 7,876,534 B2* | 1/2011 | Chou et al. | .................... | 360/319 |

FOREIGN PATENT DOCUMENTS

| | | |
|---|---|---|
| JP | 2003-016607   | 1/2003 |
| JP | 2003-016607 A | 1/2003 |
| JP | 2006-252620   | 9/2006 |
| JP | 2006-252620 A | 9/2006 |
| JP | 2007-294059   | 11/2007 |
| JP | 2007-294059 A | 11/2007 |
| JP | 2008-71469 A  | 3/2008 |
| JP | 2008-226424   | 9/2008 |
| JP | 2008-226424 A | 9/2008 |
| JP | 2010-135008 A | 6/2010 |

OTHER PUBLICATIONS

Information Sheet.
Notice of Reasons for Rejection mailed by Japan Patent Office on Jun. 29, 2010 in the corresponding Japanese patent application No. 2009-141505.

* cited by examiner

*Primary Examiner* — Mark Blouin
(74) *Attorney, Agent, or Firm* — Knobee Martens Olson & Bear LLP (57) ABSTRACT

According to an embodiment, a magnetic head for perpendicular recording, includes a slider including a facing surface opposed to a recording medium, and a head portion on the slider and configured to perform information processing for the recording medium. The head portion includes a main pole configured to apply a perpendicular recording magnetic field to the recording medium, a recording coil configured to excite the main pole, a write shield pole opposing the main pole across a write gap, side shields arranged individually on opposite sides of the main pole in a track width direction and magnetically isolated from the main pole, and low-flux-density layers formed of a material having a saturation magnetic flux density lower than that of the main pole, located between the main pole and the side shields, and configured to regulate magnetic fluxes flowing from the main pole to the side shields.

7 Claims, 8 Drawing Sheets

MAGNETIC HEAD AND DISK DRIVE PROVIDED WITH THE SAME

CROSS-REFERENCE TO RELATED APPLICATIONS

This application is based upon and claims the benefit of priority from Japanese Patent Application No. 2009-141505, filed Jun. 12, 2009, the entire contents of which are incorporated herein by reference.

BACKGROUND

1. Field

One embodiment of the invention relates to a magnetic head for perpendicular magnetic recording used in a disk drive and a disk drive provided with the magnetic head.

2. Description of the Related Art

A disk drive, e.g., a magnetic disk drive, comprises a magnetic disk, spindle motor, magnetic head, and carriage assembly. The magnetic disk is disposed in a case. The spindle motor supports and rotates the disk. The magnetic head writes and reads information to and from the disk. The carriage assembly supports the head for movement relative to the disk. The head comprises a slider attached to a suspension of the carriage assembly and a head portion on the slider. The head portion is constructed including a recording head for writing and a reproducing head for reading.

In recent years, magnetic heads for perpendicular magnetic recording have been proposed to provide magnetic disk drives of higher recording densities, larger capacities, or smaller sizes. In these magnetic heads, a recording head comprises a main pole, write shield pole, and coil. The main pole produces a perpendicular magnetic field. The write shield pole is located on the trailing side of the main pole with a write gap therebetween and serves to close a magnetic path between itself and a magnetic disk. The coil serves to pass a magnetic flux through the main pole. Side shields are arranged individually on the opposite sides of the main pole in a track width direction. The side shields are magnetically coupled to the write shield pole. A part of an end portion of the main pole is located between the side shields (e.g., Jpn. Pat. Appln. KOKAI Publications Nos. 2007-294059 and 2006-252620).

A recording magnetic field is applied to the magnetic disk from just below the main pole, whereupon a recording pattern is perpendicularly recorded on a recording layer of the disk along a track of a width substantially equal to the write gap width.

In the perpendicular magnetic recording heads furnished with the side shields described above, application of magnetic fields to adjacent tracks can be suppressed. On the other hand, however, the strength of the magnetic field from the main pole that records on-track signals is reduced. Possibly, therefore, a structure may be proposed to secure the magnetic field strength by enlarging a constricted portion at the distal end of the main pole. If such a bulky main pole is combined with the side shields, magnetic fluxes that flow directly from the main pole to the side shields increase. If the magnetic fluxes leak from just below the side shields, information on the adjacent tracks may be erased or degraded. Thus, it is difficult to further improve the recording density.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to an aspect of the invention, there is provided a magnetic head for perpendicular recording, comprising: a slider comprising a facing surface opposed to a recording medium; and a head portion on the slider and configured to perform information processing for the recording medium, the head portion comprising a main pole configured to apply a perpendicular recording magnetic field to the recording medium, a recording coil configured to excite the main pole, a write shield pole opposing the main pole across a write gap, side shields arranged individually on opposite sides of the main pole in a track width direction and magnetically isolated from the main pole, and low-flux-density layers formed of a material having a saturation magnetic flux density lower than that of the main pole, located between the main pole and the side shields, and configured to regulate magnetic fluxes flowing from the main pole to the side shields.

According to another aspect of the invention, there is provided a disk drive comprising a disk shaped recording medium comprising a recording layer having magnetic anisotropy perpendicular to a surface of the medium; a drive section configured to support and rotate the recording medium; and a magnetic head comprising a slider comprising a facing surface opposed to the surface of the recording medium and a head portion on the slider and configured to perform information processing for the recording medium, the head portion comprising a main pole configured to apply a perpendicular recording magnetic field to the recording medium, a recording coil configured to excite the main pole, a write shield pole opposing the main pole across a write gap, side shields arranged individually on opposite sides of the main pole in a track width direction and magnetically isolated from the main pole, and low-flux-density layers formed of a material having a saturation magnetic flux density lower than that of the main pole, located between the main pole and the side shields, and configured to regulate magnetic fluxes flowing from the main pole to the side shields.

An embodiment in which a disk drive according to this invention is applied to a hard disk drive (HDD) will now be described in detail with reference to the accompanying drawings.

Figure 1:
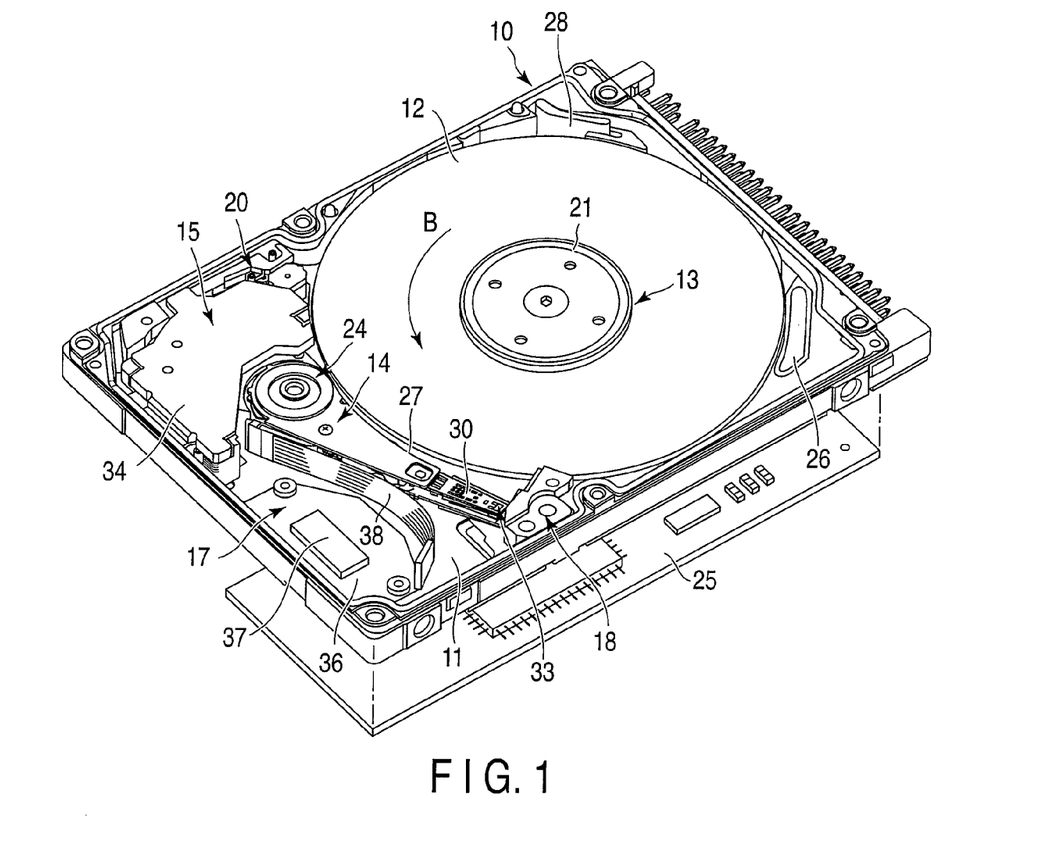
FIG. 1 is an exemplary a perspective view showing an HDD according to a first embodiment of the invention.
Figure 2:
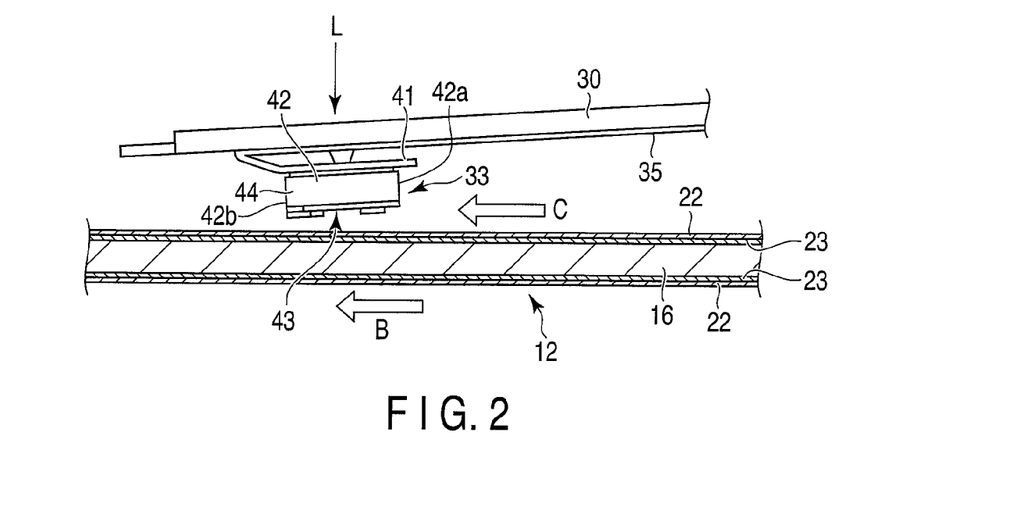
FIG. 2 is an exemplary side view showing a magnetic head and suspension of the HDD.

FIG. 1 shows the internal structure of the HDD with its top cover removed. FIG. 2 shows a magnetic head in a flying state. As shown in FIG. 1, the HDD comprises a housing 10. The housing 10 comprises a base 11 in the form of an open-topped rectangular box and a top cover (not shown) in the form of a rectangular plate. The top cover is fastened to the base by screws so as to close a top opening of the base. Thus, the inside of the housing 10 is kept airtight and can communicate with the outside only through a breathing filter 26. The base 11 and top cover are formed of a metallic material, such as aluminum, stainless steel, or cold-rolled carbon steel.

The base 11 carries thereon a magnetic disk 12 for use as a recording medium and a mechanical unit. The mechanical unit comprises a spindle motor 13, a plurality of (e.g., two) magnetic heads 33, head actuator 14, and voice coil motor (VCM) 15. The spindle motor 13 supports and rotates the disk 12. The heads 33 write and read information to and from the disk. The head actuator 14 supports the heads for movement relative to surfaces of the disk 12. The VCM 15 rotates and positions the head actuator. Further, the base 11 carries thereon a ramp load mechanism 18, inertia latch mechanism 20, and board unit 17. The ramp load mechanism 18 holds the magnetic heads 33 in a position at a distance from the magnetic disk 12 when the heads are moved to the outermost periphery of the disk. The inertia latch mechanism 20 holds the head actuator 14 in a retracted position. Electronic components, such as a preamplifier, head IC, etc., are mounted on the board unit 17.

A control circuit board 25 is attached to the outer surface of the base 11 by screws so as to be opposed to a bottom wall of the base 11. The circuit board 25 controls the operations of the spindle motor 13, VCM 15, and magnetic heads 33 through the board unit 17.

As shown in FIGS. 1 and 2, the magnetic disk 12 is constructed as a perpendicular two-layer film medium. The disk 12 comprises a disk-shaped substrate 16 of a nonmagnetic material having a diameter of about 2.5 inches, for example. A soft magnetic underlayer 23, perpendicular magnetic recording layer 22, and protective film (not shown) are successively laminated to each surface of the substrate 16 in the order named. An upper layer portion of the recording layer 22 has magnetic anisotropy perpendicular to the disk surfaces.

As shown in FIG. 1, the magnetic disk 12 is coaxially fitted on a hub of the spindle motor 13, clamped by a clamp spring 21 attached to the upper end of the hub by screws, and fixed to the hub. The disk 12 is rotated at a predetermined speed in the direction of arrow B by the spindle motor 13 for use as a drive motor.

The head actuator 14 comprises a bearing 24, which is fixed on the bottom wall of the base 11, and arms 27 extending from the bearing. The arms 27 are located parallel to the surfaces of the magnetic disk 12 and extend in the same direction from the bearing 24. The head actuator 14 comprises suspensions 30 each in the form of an elastically deformable elongated plate. Each suspension 30 has its proximal end fixed to the distal end of its corresponding arm 27 by spot welding or adhesive bonding and extends from the arm. Each suspension 30 may be formed integrally with its corresponding arm 27. The magnetic heads 33 are supported individually on the respective extended ends of the suspensions 30. The arms 27 and suspensions 30 constitute a head suspension, and the head suspension and magnetic heads 33 constitute a head suspension assembly.

As shown in FIG. 2, each magnetic head 33 comprises a substantially cuboid slider 42 and read/write head portion 44 on an outflow end (or trailing end) of the slider. The head 33 is fixed to a gimbal spring 41 on the distal end portion of each suspension 30. Each head 33 is subjected to a head load L that is directed to a surface of the magnetic disk 12 by the elasticity of the suspension 30. The two arms 27 are spaced apart from each other in parallel relation, and the suspensions 30 and magnetic heads 33 on the arms are opposed to each other with the magnetic disk 12 between them.

Each magnetic head 33 is electrically connected to a main flexible printed circuit board (FPC) 38 (mentioned later) through a relay FPC 35 fixed on each corresponding suspension 30 and arm 27.

As shown in FIG. 1, the board unit 17 comprises an FPC main body 36 formed of a flexible printed circuit board and main FPC 38 extending from the main body. The FPC main body 36 is fixed on the bottom surface of the base 11. A preamplifier 37, head IC, and other electronic components are mounted on the main body 36. An extended end of the main FPC 38 is connected to the head actuator 14 and also to the magnetic heads 33 through the relay FPCs 35 corresponding thereto.

The VCM 15 comprises a support frame (not shown), which extends from the bearing 24 in the direction opposite from the arms 27, and a voice coil supported by the support frame. When the head actuator 14 is incorporated in the base 11, the voice coil is located between a pair of yokes 34 fixed on the base 11. In conjunction with these yokes and a magnet fixed to one of the yokes, the voice coil constitutes the VCM 15.

If the voice coil 47 is energized while the magnetic disk 12 is rotating, the head actuator 14 pivots so that each magnetic head 33 is moved to and positioned in a region over a desired track of the disk 12. As this is done, the magnetic head 33 is moved radially relative to the disk 12 between the inner and outer peripheral edge portions of the disk.

Figure 3:
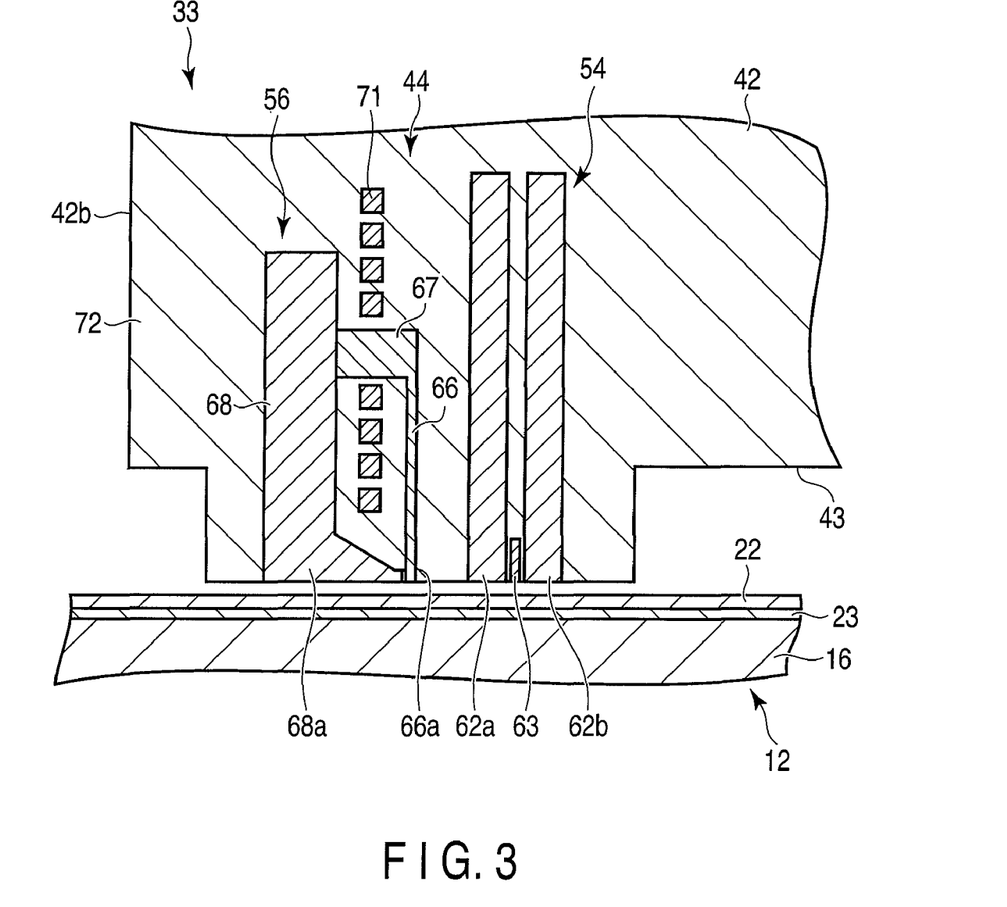
FIG. 3 is an exemplary enlarged sectional view showing a head portion of the magnetic head.
Figure 4:
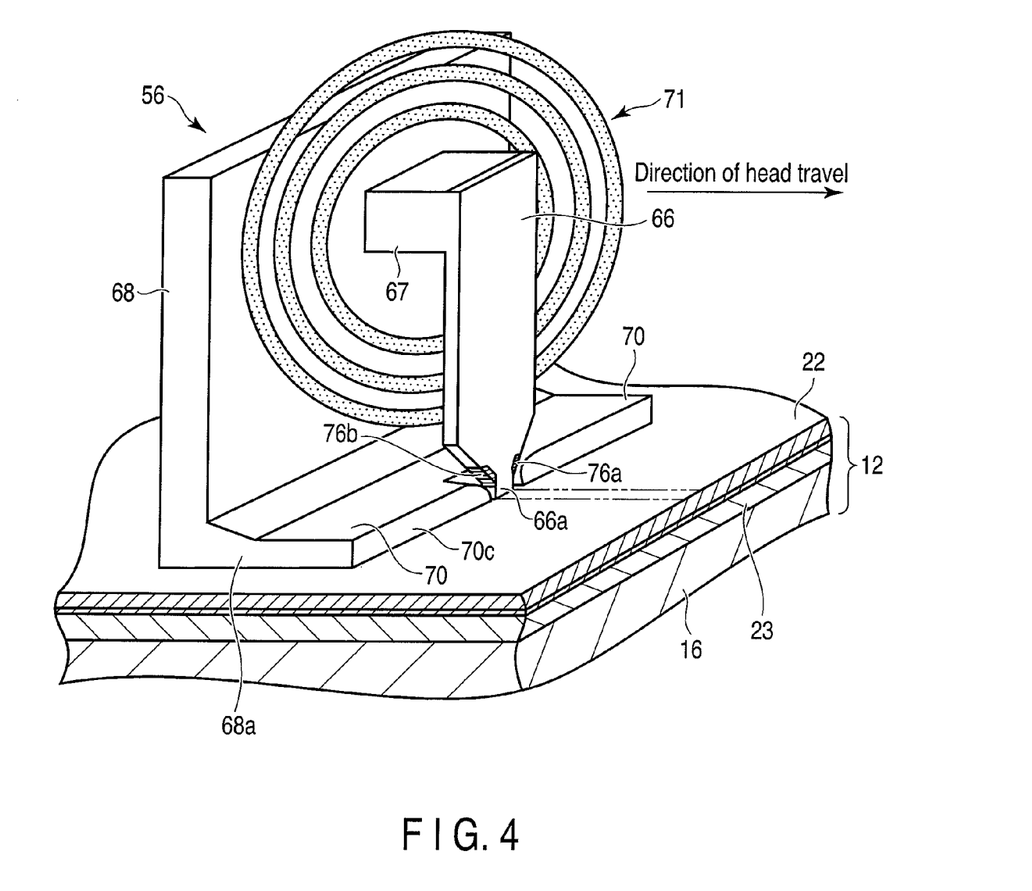
FIG. 4 is an exemplary perspective view typically showing a recording head of the magnetic head.
Figure 5:
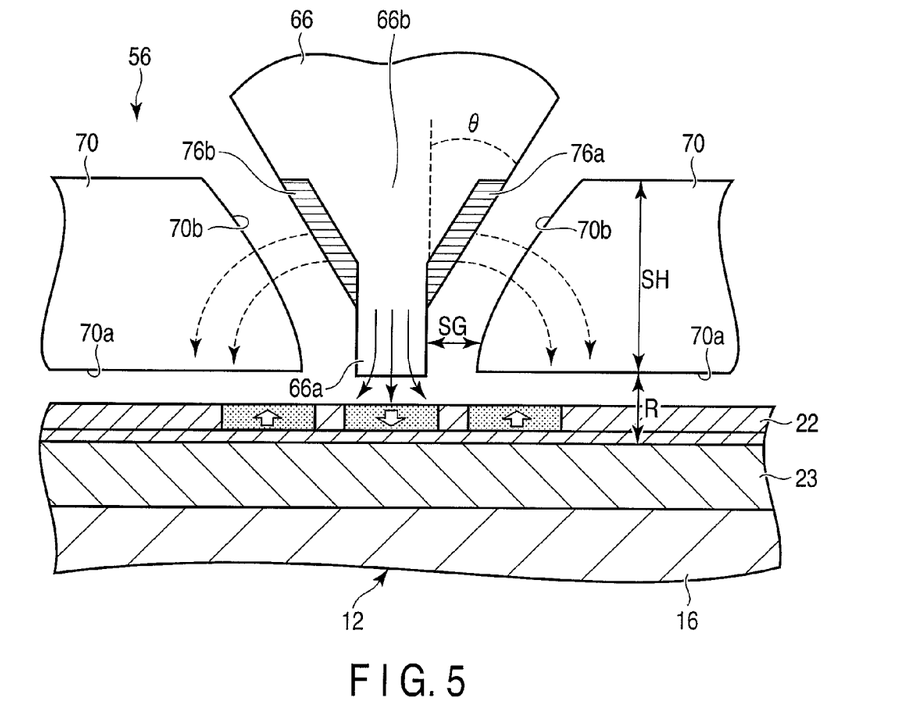
FIG. 5 is an exemplary enlarged side view showing the distal end portion of a main pole and side shields of the recording head.
Figure 6:
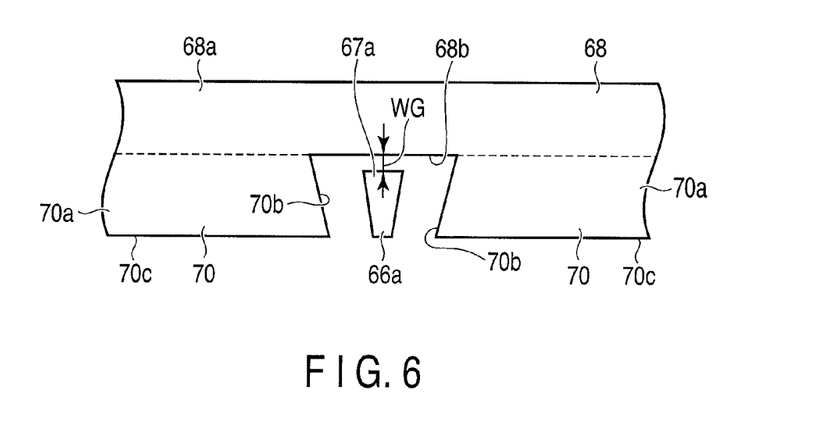
FIG. 6 is an exemplary plan view of the recording head taken from the disk-facing surface side of a slider.

The configuration of the magnetic head 33 will now be described in detail. FIG. 3 is an enlarged sectional view showing the head portion 44 of the head 33, FIG. 4 is a perspective view typically showing a recording head of the head portion, FIG. 5 is an enlarged side view showing the distal end portion of a main pole and side shields of the recording head portion, and FIG. 6 is a plan view of the recording head taken from a disk-facing surface side.

As shown in FIGS. 2 and 3, each magnetic head 33 is constructed as a flying head, comprising the substantially cuboid slider 42 and head portion 44 formed on the outflow end (or trailing end) of the slider. The slider 42 is formed of, for example, a sintered body (AlTic) based on alumina and titanium carbide, while the head portion 44 is formed by laminating thin films.

The slider 42 comprises a rectangular disk-facing surface or air bearing surface (ABS) 43 that faces the surface of the magnetic disk 12. The slider 42 is flown by airflow C that is produced between the disk surface and disk-facing surface 43 as the disk 12 rotates. The direction of airflow C is coincident with the direction of rotation B of the disk 12. The slider 42 is located relative to the surface of the disk 12 in such a manner that the longitudinal direction of the disk-facing surface 43 is substantially coincident with the direction of airflow C.

The slider 42 comprises a leading end 42a on the inflow side of airflow C and a trailing end 42b on the outflow side of the airflow. A leading step, trailing step, sidesteps, negative-pressure cavity, etc., are formed in the disk-facing surface 43 of the slider 42.

As shown in FIG. 3, the head portion 44 comprises a reproducing head 54 and recording head 56, which are formed on the trailing end 42b of the slider 42 by a thin-film process, and is formed as a split magnetic head in which the recording and reproducing heads are separate from each other.

The reproducing head 54 comprises a magnetic film 63 having a magnetoresistive effect and soft magnetic shielding films 62a and 62b, which are located on the trailing and leading sides of the film 63 so that the film 63 is sandwiched between them. The respective lower ends of the magnetic film 63 and shielding films 62a and 62b are exposed on the disk-facing surface 43 of the slider 42. The reproducing head 54 serves to reproduce information recorded on the magnetic disk 12.

The recording head 56 is disposed nearer to the trailing end 42b of the slider 42 than the reproducing head 54. The recording head 56 is formed as a single-pole head that comprises a write shield electrode on the trailing end side. As shown in FIGS. 3 and 4, the recording head 56 comprises a main pole 66, write shield electrode (return pole) 68, junction 67, and recording coil 71. The main pole 66 is formed of a soft magnetic material, having high permeability and saturation magnetic flux density to produce a recording magnetic field perpendicular to the surface of the magnetic disk 12. The write shield electrode 68 is located on the trailing side of the main pole 66 and serves to efficiently close a magnetic path through the soft magnetic underlayer 23 just below the main pole. The junction 67 connects an upper part of the main pole 66 to the electrode 68. The recording coil 71 is wound around the magnetic path including the main pole 66 and electrode 68 in order to pass a magnetic flux through the main pole 66 in writing a signal to the disk 12.

As shown in FIGS. 3 to 5, the main pole 66 is a column extending at right angles to the surface of the magnetic disk 12. The lower end portion of the main pole 66 on the disk side is tapered so that its width is reduced toward the disk 12 and its distal end portion 66a is narrower than the other portion. As shown in FIG. 6, the distal end portion 66a of the main pole 66 has, for example, a trapezoidal profile and comprises a trailing end face 67a, leading end face, and opposite side faces. The trailing end face 67a has a predetermined width and is located on the trailing end side. The leading end face, which is narrower than the trailing end face, is opposed to the trailing end face. The lower end face of the main pole 66 is exposed on the disk-facing surface 43 of the slider 42. The width of the trailing end face 67a is substantially equal to that of the track of the magnetic disk 12.

The write shield electrode 68 is substantially L-shaped and its lower end portion 68a has an elongated rectangular shape. The lower end face of the electrode 68 is exposed on the disk-facing surface 43 of the slider 42. A leading end face 68b of the lower end portion 68a extends transversely relative to the track of the magnetic disk 12. The leading end face 68b faces the trailing end face 67a of the main pole 66 in parallel relation with write gap WG between them.

In the recording head 56, as shown in FIGS. 4 to 6, a pair of side shields 70 are arranged on the opposite sides of the main pole 66 with respect to the length of write gap WG or the track width. On the disk-facing surface 43, the side shields 70 are magnetically isolated from the main pole 66. Each side shield 70 is formed integrally with the lower end portion 68a of the write shield electrode 68 using a soft magnetic material having high permeability and saturation magnetic flux density. The side shield 70 extends from the leading end face 68b of the lower end portion 68a toward the leading end side of the slider 42.

Each of the side shields 70 comprises a bottom surface 70a, side face 70b, leading end face 70c, and top surface. The bottom surface 70a is exposed on the disk-facing surface 43 and faces the magnetic disk 12. The side face 70b rises from the bottom surface and faces the main pole 66 across gap SG. The leading end face 70c rises from the bottom surface 70a. The top surface is opposed to the bottom surface. Height (or thickness) SH of each side shield 70 is greater than that of the distal end portion 66a of the main pole 66. The side face 70b of each side shield 70 is formed to be circular-arc-shaped or tilted and is opposed to respective side faces of the distal end portion 66a and a constricted portion 66b of the main pole 66 across gap SG.

As shown in FIGS. 4 and 5, a low-flux-density layer is formed in a position that is recessed from the disk-facing surface 43 of the slider 42 and where the side face 70b of each side shield 70 is opposed to the main pole 66. In the present embodiment, low-flux-density layers 76a and 76b are formed individually on the opposite side faces of the constricted portion 66b of the main pole 66, in the position where the side face 70b of each side shield 70 is opposed to the main pole 66. Each of the layers 76a and 76b is located in a position spaced apart from the disk-facing surface 43 on the side opposite from the magnetic disk 12, that is, it extends upward from the root of the distal end portion 66a of the main pole 66 to a height level substantially equivalent to height SH of each side shield 70.

The low-flux-density layers 76a and 76b are formed of a soft magnetic material having a saturation magnetic flux density Bs2 lower than that (Bs1) of the main pole 66. In the present embodiment, the saturation magnetic flux density Bs2 of the soft magnetic material that forms the layers 76a and 76b is lower than that (Bs3) of the material of the side shields 70. The soft magnetic materials with the saturation magnetic flux densities Bs1, Bs2 and Bs3 are selected from alloys or compounds that contain at least one of substances including Fe, Co and Ni. The low-flux-density layers 76a and 76b may be overlaid individually on the opposite side faces of the constricted portion 66b or formed integrally with the main pole 66 by adjusting the composition of the opposite side face portions of the constricted portion 66b. The layers 76a and 76b suppress magnetic fluxes that flow directly from the main pole 66 to the side shields 70, as indicated by broken-line arrows in FIG. 5.

As shown in FIG. 3, the whole regions of the reproducing head 54 and recording head 56 are covered by a protective insulating film 72 except for those parts which are exposed on the disk-facing surface 43 of the slider 42. The insulating film 72 forms the contour of the head portion 44.

If the VCM 15 is driven, according to the HDD constructed in this manner, the head actuator 14 is pivoted so that each magnetic head 33 is moved to and positioned in a region over a desired track of the magnetic disk 12. As the disk 12 is rotated, moreover, the head 33 is flown by airflow C produced between the disk surface and disk-facing surface 43. When the HDD is powered, the disk-facing surface 43 of the slider 42 is opposed to the disk surface across a gap. As shown in FIG. 2, the magnetic head 33 flies in such a tilted posture that the recording head 56 of the head portion 44 is located nearest the surface of the magnetic disk 12. In this state, the reproducing head 54 reads recorded information from the disk 12, while the recording head 56 writes information to the disk.

In writing the information, the recording coil 71 excites the main pole 66 to apply the perpendicular recording magnetic field to the recording layer 22 of the magnetic disk 12 just below the main pole, thereby recording information with a desired track width. When this is done, writing to adjacent tracks can be prevented by providing the side shields 70 on the opposite sides of the distal end portion 66a of the main pole 66. Further, the low-flux-density layers 76a and 76b are disposed in those regions where the main pole 66 is opposed to the side shields, and they can regulate and intercept the magnetic fluxes that flow directly from the main pole 66 to the side shields 70. Thus, the magnetic fluxes can be prevented from leaking toward the magnetic disk 12 from just below the side shields 70, so that the possibility of information on the adjacent tracks being erased or degraded. Consequently, the quality of on-track signals can be maintained or improved to reduce fringing fields for the adjacent tracks, and the density of the magnetic recording on the magnetic disk can be increased.

The magnetic head according to the present embodiment and ones according to Comparative Examples (a) and (b) without low-flux-density layers are prepared, and their performances are compared. The magnetic head of Comparative Example (a) has a conventional structure. The magnetic head of Comparative Example (b) is a conventional one that incorporates a main pole with an increased reduction angle θ (FIG. 5) or the like to secure satisfactory magnetic field strength. In the magnetic head of the present embodiment, the main pole 66 was formed of a material with the saturation magnetic flux density Bs1 of 2.4 T, and the side shields 70 of a material with the saturation magnetic flux density Bs3 of 1.9 T. The low-flux-density layers 76a and 76b were formed of materials of two types with the saturation magnetic flux densities Bs2 of 1.5 and 0.8 T, which constitute Examples (a) and (b), respectively.

Figure 7:
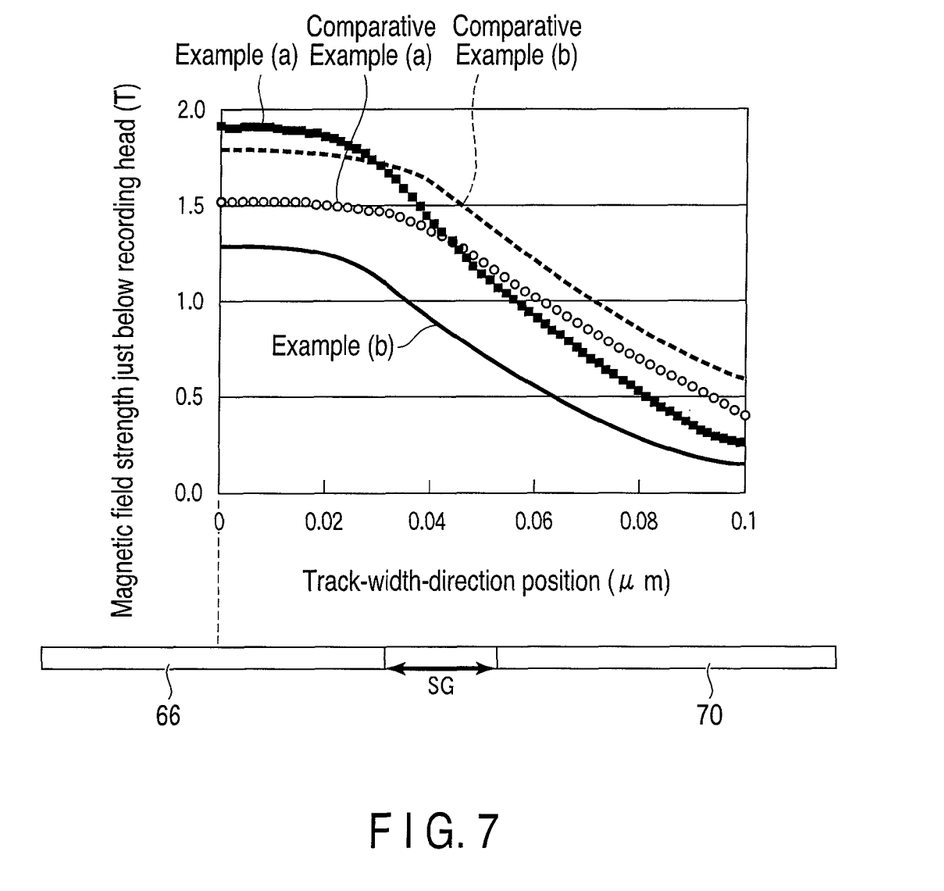
FIG. 7 is an exemplary diagram comparatively showing changes of magnetic field strength along the track width of magnetic heads according to the present embodiment and comparative examples.
Figure 8:
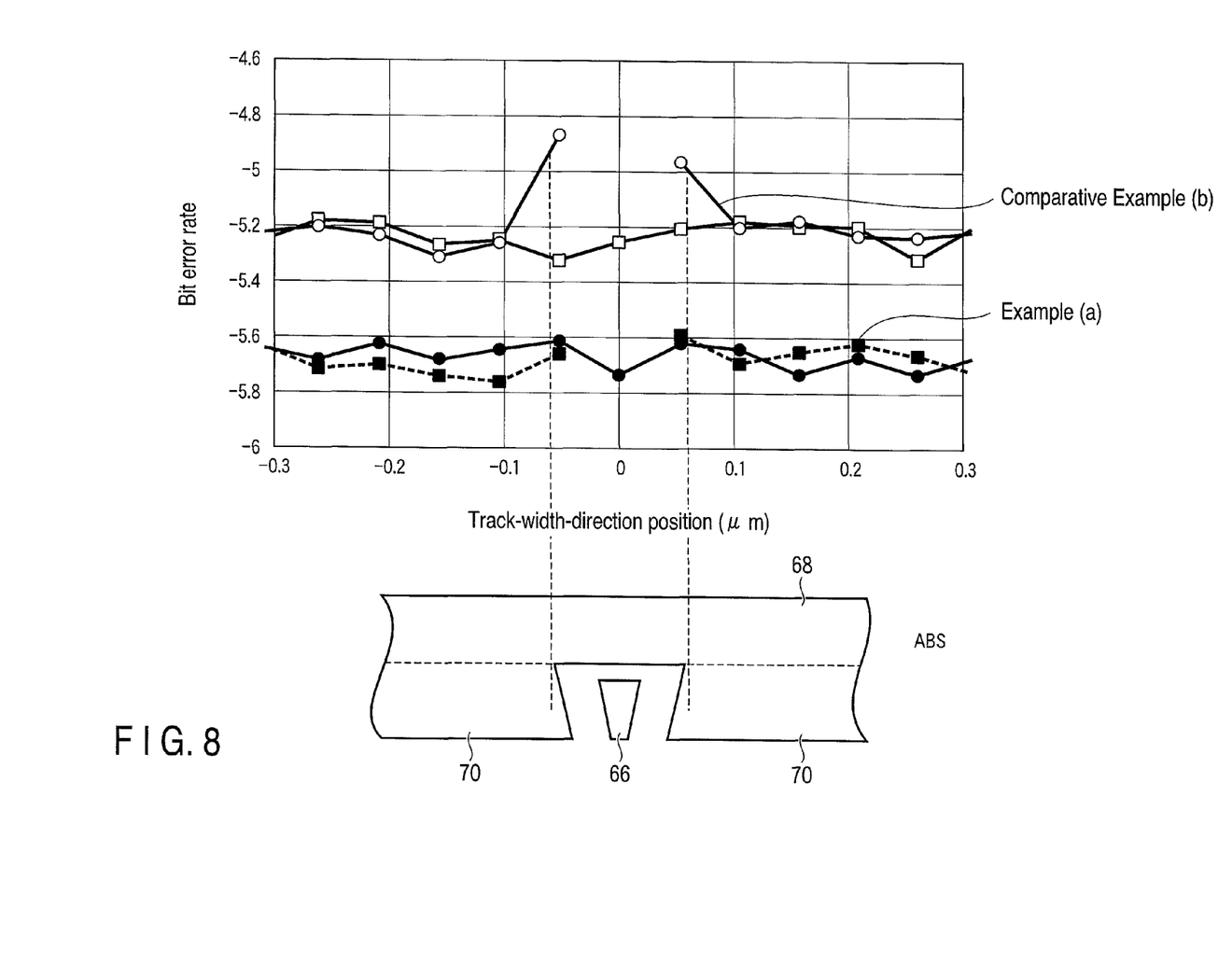
FIG. 8 is an exemplary diagram comparatively showing bit error rates along the track width of the magnetic heads according to the present embodiment and comparative examples.

FIGS. 7 and 8 are diagrams for comparison between the recording performances of the magnetic heads according to Examples (a) and (b) and Comparative Examples (a) and (b). FIG. 7 comparatively shows off-track profiles of recording magnetic field distributions for the magnetic heads of Examples (a) and (b) and Comparative Examples (a) and (b).

In FIG. 7, a zero track-width-direction position is defined as the track-width-direction central position of the main pole 66, and one-side off-track profiles of the recording magnetic field distributions for the magnetic heads of the examples and comparative examples are represented by characteristic curves.

In the case of Comparative Example (b) compared to Comparative Example (a), the magnetic field strength is increased in the region just below the main pole 66, while the strength of magnetic fields leaked from just below the side shields 70 is also increased. In the case of the magnetic head of Comparative Example (b), the erase width control by the side shields and the magnetic field strength just below the main pole can be said to be in trade-off relation.

According to the magnetic head of Example (a) compared to Comparative Example (b), on the other hand, the magnetic field strength just below the main pole 66 is found to be maintained or improved so that the leakage of magnetic fields to the adjacent tracks is reduced. In the case of Example (b), moreover, the magnetic field strength just below the main pole 66 is significantly degraded, although the leakage magnetic field strength just below the side shields 70 is reduced.

FIG. 8 comparatively shows off-track profiles of bit error rates (BER) for the magnetic heads of Example (a) and Comparative Example (b). The zero track-width-direction position is defined as the track-width-direction central position of the main pole 66 of the recording head.

In FIG. 8, a characteristic curve that connects blank squares (□) represents the bit error rate obtained when lateral offset is performed in the track width direction around the zero track-width-direction position as random data is written to and reproduced from the magnetic disk by the magnetic head of Comparative Example (b). A characteristic curve that connects blank circles (○) represents the off-track profile of the bit error rate obtained when the lateral offset is performed again in the track width direction as data is reproduced after being written 10,000 times in the zero track-width-direction position by the magnetic head of Comparative Example (b). If recording magnetic fields leak from the side shields 70, they reach the adjacent tracks and erase information. When compared to the case of the characteristic curve connecting the blank squares, as seen from the diagram, therefore, the bit error rate is degraded in the vicinities of the side edges of the side shields 70.

In FIG. 8, a characteristic curve that connects solid circles (●) represents the bit error rate obtained when the lateral offset is performed in the track width direction around the zero track-width-direction position as random data is written to and reproduced from the magnetic disk by the magnetic head of Example (a). A characteristic curve that connects solid squares (■) represents the off-track profile of the bit error rate obtained when the lateral offset is performed again in the track width direction as data is reproduced after being written 10,000 times in the zero track-width-direction position by the magnetic head of Example (a). These profiles indicate that, in the case of recording by the magnetic head of Example (a), the bit error rate at the adjacent tracks is so low that the recording performance is considerably improved when compared to the case of Comparative Example (b). Thus, according to the magnetic head of Example (a), the track density can be increased without reducing the signal quality of the adjacent tracks just below the side shields 70.

Figure 9:
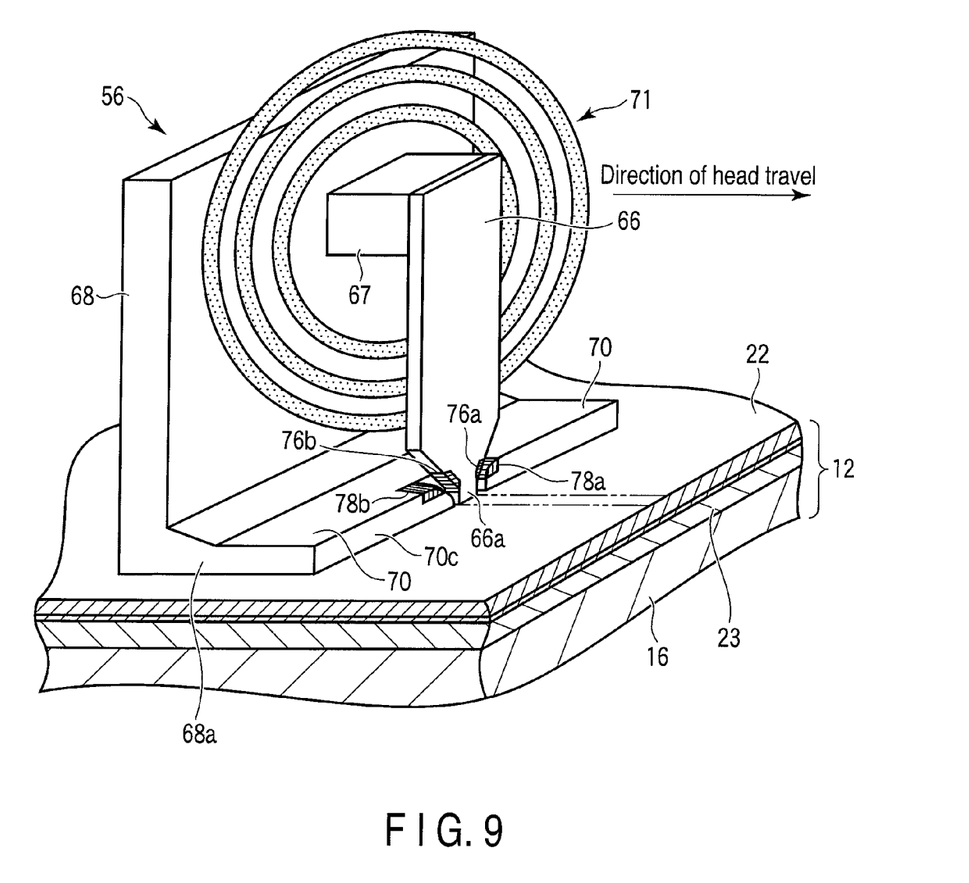
FIG. 9 is an exemplary perspective view typically showing a recording head of a magnetic head according to a second embodiment of the invention.

The following is a description of a magnetic head of an HDD according to a second embodiment of the invention. FIG. 9 is a perspective view typically showing a recording head of a head portion, and FIG. 10 is an enlarged side view showing the distal end portion of a main pole and side shields of the recording head portion.

Figure 10:
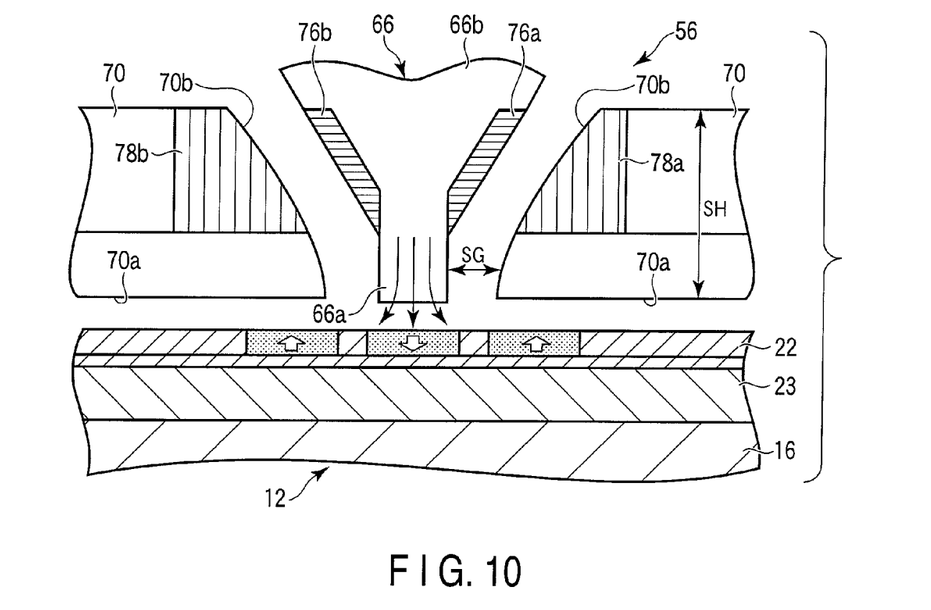
FIG. 10 is an exemplary enlarged side view showing the distal end portion of a main pole and side shields of the recording head.

According to the second embodiment, as shown in FIGS. 9 and 10, a recording head 56 of the magnetic head comprises a main pole 66, write shield electrode (return pole) 68, junction 67, and recording coil 71. The main pole 66 is formed of a soft magnetic material, having high permeability and saturation magnetic flux density to produce a recording magnetic field perpendicular to the surface of the magnetic disk 12. The write shield electrode 68 is located on the trailing side of the main pole 66 and serves to efficiently close a magnetic path through the soft magnetic underlayer 23 just below the main pole. The junction 67 connects an upper part of the main pole 66 to the electrode 68. The recording coil 71 is wound around the magnetic path including the main pole 66 and electrode 68 in order to pass a magnetic flux through the main pole 66 in writing a signal to the disk 12. The main pole 66 is a column extending at right angles to the surface of the magnetic disk 12. The lower end portion of the main pole 66 on the disk side is tapered so that its width is reduced toward the disk 12 and its distal end portion 66a is narrower than the other portion.

The recording head 56 comprises a pair of side shields 70 arranged individually on opposite sides of the main pole 66 in a track width direction. On a disk-facing surface 43, the side shields 70 are magnetically isolated from the main pole 66. Each side shield 70 is formed integrally with a lower end portion 68a of the write shield electrode 68 using a soft magnetic material having high permeability and saturation magnetic flux density. The side shield 70 extends from a leading end face 68b of the lower end portion 68a toward the leading end side of a slider 42.

A low-flux-density layer is formed in a position that is recessed from the disk-facing surface 43 of the slider 42 and where a side face 70b of each side shield 70 is opposed to the main pole 66. In the present embodiment, low-flux-density layers 76a and 76b are formed individually on the opposite side faces of a constricted portion 66b of the main pole 66, in the position where the side face 70b of each side shield 70 is opposed to the main pole 66. Each of the layers 76a and 76b is located in a position spaced apart from the disk-facing surface 43 on the side opposite from the magnetic disk 12, that is, it extends upward from the root of the distal end portion 66a of the main pole 66 to a height level substantially equivalent to height SH of each side shield 70.

Further, low-flux-density layers 78a and 78b are formed individually on the respective side faces 70b of the side shields 70 in positions where the main pole 66 is opposed to the side faces 70b.

The low-flux-density layers 76a and 76b are formed of a soft magnetic material having a saturation magnetic flux density $Bs2$ lower than that ($Bs1$) of the main pole 66. In the present embodiment, the saturation magnetic flux density $Bs2$ of the soft magnetic material that forms the layers 76a and 76b is lower than that ($Bs3$) of the material of the side shields 70. The low-flux-density layers 78a and 78b are formed of a soft magnetic material having a saturation magnetic flux density $Bs4$ lower than that ($Bs3$) of the material of the side shields 70. The soft magnetic materials with the saturation magnetic flux densities $Bs1$, $Bs2$, $Bs3$ and $Bs4$ are selected from alloys or compounds that contain at least one of substances including Fe, Co and Ni.

The low-flux-density layers 76a and 76b may be overlaid individually on the opposite side faces of the constricted portion 66b or formed integrally with the main pole 66 by adjusting the composition of the opposite side face portions of the constricted portion 66b. The low-flux-density layers 78a and 78b may be overlaid individually on the respective side faces 70b of the side shields 70 or formed integrally with the side shields by adjusting the composition of the side face portions of the side shields. The layers 76a, 76b, 78a and 78b suppress magnetic fluxes that flow directly from the main pole 66 to the side shields 70.

The low-flux-density layers need not always be disposed on both the main pole 66 and the side faces 70b of the side shields 70, and may alternatively be disposed only on the side faces 70b of the side shields 70 in the positions where the main pole 66 is opposed to the side faces 70b.

Other configurations of the magnetic heads and HDD of the second embodiment are the same as those of the foregoing first embodiment. Therefore, like reference numbers refer to like parts throughout the several views of the drawing, and a detailed description of those parts is omitted. The magnetic heads of the second embodiment constructed in the above-described manner can provide the same functions and effects as those of the first embodiment.

In the magnetic head of the second embodiment, the main pole 66, side shields 70, low-flux-density layers 76a and 76b on the main pole side, and low-flux-density layers on the side shield side were formed of materials with the saturation magnetic flux densities $Bs1$, $Bs3$, $Bs2$ and $Bs4$ of, for example, 2.4, 1.9, 1.5 and 1.2 T, respectively, and their respective performances were compared to those of the prior art magnetic heads.

According to the magnetic head of the present embodiment, compared to the prior art ones, the magnetic field strength just below the main pole can be maintained or improved, so that the leakage of magnetic fields to the adjacent tracks can be reduced. Further, lateral off-track was performed in the track width direction around the zero track-width-direction position as random data was written to and reproduced from the magnetic disk, and the off-track profile of the bit error rate was measured. Thereafter, the off-track was performed as data was reproduced after being written 10,000 times at the zero position in the track-width-direction, and the off-track profile of the bit error rate was measured. Thus, the off-track profile was checked for a change. In the cases of the prior art magnetic heads, the bit error rate for the adjacent tracks just below the vicinities of the side shield edges was degraded. In the case of the magnetic head of the present embodiment, on the other hand, the equivalent bit error rate was not degraded.

This indicates that the magnetic head according to the present embodiment produces an effect that the track density can be increased without reducing the signal quality of the adjacent tracks.

Figure 11:
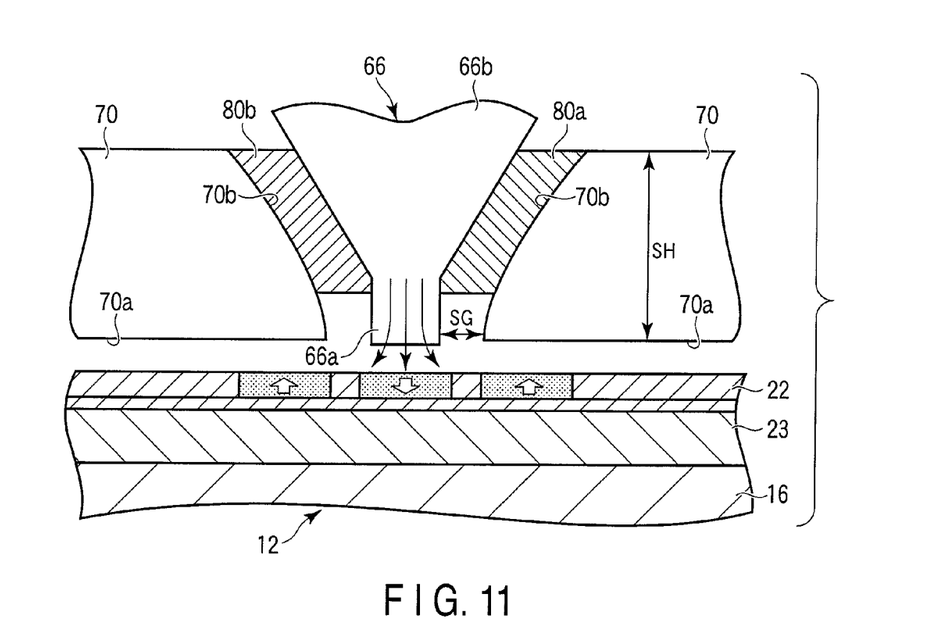
FIG. 11 is an exemplary enlarged side view showing the distal end portion of a main pole and side shields of a recording head of a magnetic head according to a third embodiment of the invention.

The following is a description of a magnetic head of an HDD according to a third embodiment of the invention. FIG. 11 is an enlarged view showing the distal end portion of a main pole and side shields of a recording head portion.

According to the third embodiment, as shown in FIG. 11, a low-flux-density layer is formed in a position that is recessed from a disk-facing surface of a slider and where a side face 70b of each side shield 70 is opposed to a main pole 66. In this case, low-flux-density layers 80a and 80b are filled in gaps between the main pole 66 and the respective side faces 70b of the side shields 70 so as to contact the side faces 70b. Each of the layers 80a and 80b extends upward from the root of a distal end portion 66a of the main pole 66 to a height level substantially equivalent to height SH of each side shield 70.

The low-flux-density layers 80a and 80b are formed of a soft magnetic material having a saturation magnetic flux density $Bs5$ lower than those ($Bs1$ and $Bs3$) of the main pole 66 and side shields 70. The soft magnetic materials with the saturation magnetic flux densities $Bs1$, $Bs3$ and $Bs5$ are selected from alloys or compounds that contain at least one of substances including Fe, Co and Ni.

The main pole 66, side shields 70, and low-flux-density layers 80a and 80b are formed of materials with the saturation magnetic flux densities $Bs1$, $Bs3$ and $Bs5$ of, for example, 2.4, 1.9 and 0.5 T, respectively.

Other configurations of the magnetic heads and HDD of the third embodiment are the same as those of the foregoing first embodiment. Therefore, like reference numbers refer to like parts throughout the several views of the drawing, and a detailed description of those parts is omitted. The magnetic heads of the third embodiment constructed in the above-described manner can provide the same functions and effects as those of the first embodiment.

While certain embodiments of the invention have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

For example, the materials of the individual elements of the recording head are not limited to the embodiments described herein and may be varied as required. Also, the values of the saturation magnetic flux densities of the individual elements are not limited to the embodiments described herein and may be varied as required. If necessary, the material, shape, size, etc., of each element that constitutes the head portion can be changed. In the magnetic disk drive, moreover, the number of magnetic disks and heads can be increased as required, and the disk sizes are variously selectable.

What is claimed is:

1. A magnetic head for perpendicular recording, comprising:
    a slider comprising a facing surface facing a recording medium; and
    a head portion on the slider and configured to perform information processing for the recording medium, the head portion comprising
        a main pole configured to apply a perpendicular recording magnetic field to the recording medium,
        a recording coil configured to excite the main pole,
        a write shield pole facing the main pole across a write gap,
        side shields on opposite sides of the main pole in a track width direction and magnetically isolated from the main pole, and
        low-flux-density layers formed of a material with a saturation magnetic flux density lower than a saturation magnetic flux density of the main pole, located between the main pole and the side shields, and configured to regulate magnetic fluxes flowing from the main pole to the side shields.

2. The magnetic head of claim 1, wherein the low-flux-density layers are on the main pole in positions where the main pole is facing to the side shields.

3. The magnetic head of claim 1, wherein the low-flux-density layers are on the side shields in positions where the main pole is facing the side shields.

4. The magnetic head of claim 1, wherein the side shields are formed of a material with a saturation magnetic flux density lower than a saturation magnetic flux density of the main pole, and the low-flux-density layers are formed of a material with a saturation magnetic flux density lower than the saturation magnetic flux densities of the main pole and the side shields.

5. The magnetic head of claim 1, wherein the main pole is extending perpendicular to a surface of the recording medium and comprises a constricted portion tapered toward the surface of the recording medium and a distal end portion extending from the constricted portion to the facing surface, and the low-flux-density layers are located in positions where a side face of the constricted portion is opposed to respective side faces of the side shields.

6. A disk drive comprising:
    a disk shaped recording medium comprising a recording layer comprising magnetic anisotropy perpendicular to a surface of the medium;
    a driver configured to support and rotate the recording medium; and
    a magnetic head comprising a slider comprising a facing surface facing the surface of the recording medium and a head portion on the slider and configured to perform information processing for the recording medium,
    the head portion comprising
        a main pole configured to apply a perpendicular recording magnetic field to the recording medium,
        a recording coil configured to excite the main pole,
        a write shield pole facing the main pole across a write gap,
        side shields on opposite sides of the main pole in a track width direction and magnetically isolated from the main pole, and
        low-flux-density layers comprising a material with a saturation magnetic flux density lower than a saturation magnetic flux density of the main pole, located between the main pole and the side shields, and configured to regulate magnetic fluxes flowing from the main pole to the side shields.

7. The disk drive of claim 6, wherein the recording medium comprises a soft magnetic underlayer.

* * * * *